United States Patent [19]

Belknap, III et al.

[11] 4,386,643
[45] Jun. 7, 1983

[54] TIRE TRACTION DEVICE

[76] Inventors: John C. Belknap, III, 17 Fair Oaks La., Cheektowaga, N.Y. 14227; Brian D. Belknap, 1740 Amherst St., Buffalo, N.Y. 14214

[21] Appl. No.: 272,666

[22] Filed: Jun. 11, 1981

[51] Int. Cl.³ ............................................. B60C 27/00
[52] U.S. Cl. .............................. 152/216; 152/225 C; 152/228; 403/362
[58] Field of Search .............. 152/228, 225 C, 225 R, 152/208, 213 R, 241, 170, 171, 178, 180, 185; 81/15.8; 24/208 R; 403/362, 22, 316, 319, 320; 301/40 S, 43, 44 R, 44 B, 51, 50, 49, 47

[56] References Cited

U.S. PATENT DOCUMENTS

| | | | |
|---|---|---|---|
| 2,443,406 | 6/1948 | Thompson | 152/225 R |
| 2,477,051 | 7/1949 | Eisenhauer, Sr. | 152/225 R |
| 2,530,108 | 4/1950 | Whichard, Sr. et al. | 152/228 |
| 2,591,300 | 4/1952 | Sampogna | 152/228 |
| 2,598,851 | 6/1952 | Spevak | 152/225 R X |
| 3,122,192 | 2/1964 | Seidell | 152/225 R |
| 3,753,456 | 8/1973 | Saunders | 152/225 R |
| 3,756,301 | 9/1973 | Belknap | 152/225 R |
| 3,861,437 | 1/1975 | Belknap | 152/225 C |
| 3,935,891 | 2/1976 | McCloud et al. | 152/225 R |

Primary Examiner—William A. Powell
Assistant Examiner—Thomas Bokan
Attorney, Agent, or Firm—Joseph P. Gastel

[57] ABSTRACT

A tire traction device including a cylindrical cup member for attachment on a rim-securing nut of a vehicle wheel by a set screw, an elongated threaded shank extending coaxially with the cup member, an elongated link having an elongated slot for receiving the elongated shank, nuts threadably mounted on the elongated shank on opposite sides of the elongated link for tightening the elongated link in an axial position on the shank wherein the elongated link both extends perpendicularly to the shank and rests against the side of a tire, and a traction member extending perpendicularly from the end of the elongated link and having a first side for gripping engagement with the tread of the tire and an opposite side for gripping engagement with the ground.

9 Claims, 5 Drawing Figures

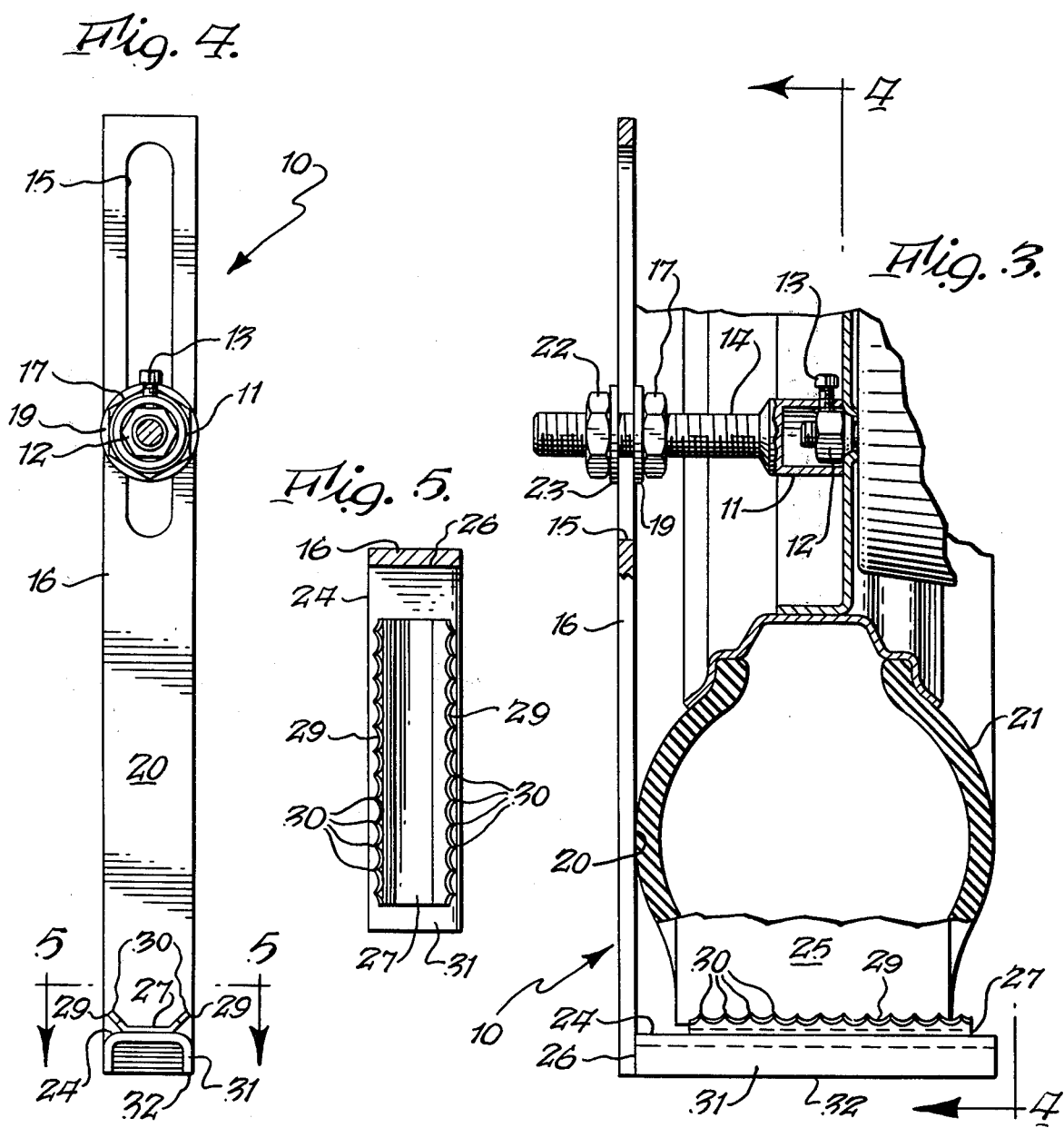

TIRE TRACTION DEVICE

BACKGROUND OF THE INVENTION

The present invention relates to an improved tire traction device of the type which is selectively mountable on an automotive wheel for the purpose of providing increased traction to dislodge the wheel from a mudhole, snowbank, or the like.

By way of background, there are numerous types of known tire traction devices for selective mounting on a vehicle wheel to increase the traction thereof. However, in the past these devices have had various shortcomings. Certain of these devices required removal of the rim-retaining lugs or nuts to enable them to be mounted on the wheel. Other devices were extremely cumbersome and complicated. Still other devices would not provide a good gripping engagement with the tire and therefore were relatively ineffectual. It is with overcoming the foregoing deficiencies of prior tire traction devices that the present invention is concerned.

SUMMARY OF THE INVENTION

It is one object of the present invention to provide an improved tire traction device which can be selectively mounted on a vehicle wheel in an extremely simple and expedient manner, without requiring removal of the rim-mounting nuts.

Another object of the present invention is to provide an improved tire traction device which is extremely simple and lightweight so that it may be carried easily in the vehicle.

Yet another object of the present invention is to provide an improved tire traction device which is adjustable so that one size will fit various sizes of vehicle wheels.

A further object of the present invention is to provide an improved tire traction device which, after being mounted on a vehicle wheel, will automatically adjust its position, as required, so as to maintain good gripping engagement with the tire and the ground notwithstanding the flexing of the tire when it engages the ground.

A still further object of the present invention is to provide an improved tire traction device which can be demounted very easily after it has served its traction purpose. Other objects and attendant advantages of the present invention will readily be perceived hereafter.

The present invention relates to a tire traction device comprising a cup member for receiving a rim-securing nut, an elongated shank extending outwardly from said cup member, an elongated link extending transversely to said elongated shank, securing means for securing said elongated shank to said elongated link, and a traction member extending transversely to said elongated link for engaging the tread of a tire and the ground.

The present invention also relates to a tire traction device comprising a member for fixed attachment relative to the rim of a wheel, an elongated shank extending outwardly from said member, an elongated link extending transversely to said elongated shank, a traction member extending transversely to said elongated link for engaging the tread of a tire and the ground, and securing means for securing said elongated shank to said elongated link while permitting said elongated link to slide radially inwardly relative to said rim when said traction member engages the ground. The various aspects of the present invention will be more fully understood when the following portions of the specification are read in conjunction with the accompanying drawings wherein:

BRIEF DESCRIPTION OF THE DRAWINGS

FIG. 1 is a side elevational view of the tire traction device of the present invention in the position in which it is mounted on a tire carrying rim;

FIG. 2 is a view similar to FIG. 1 but showing the position of the tire traction device when the traction member is located between the tire and the ground;

FIG. 3 is a fragmentary cross sectional view taken substantially along line 3—3 of FIG. 1 and showing the structural details of the tire traction device and its relationship to various portions of the tire rim and tire;

FIG. 4 is a cross sectional view taken substantially along line 4—4 of FIG. 3; and FIG. 5 is a cross sectional view taken substantially along line 5—5 of FIG. 4.

DESCRIPTION OF THE PREFERRED EMBODIMENTS

Summarizing briefly in advance, there are certain times when it is desirable to mount a traction device on a wheel of an automobile in order to provide the necessary traction to move a vehicle out of a snowbank or mudhole. With the improved device 10 of the present invention it is merely necessary to remove the wheel cover (not shown), secure one portion of the traction device 10 to a rim-securing nut or lug, adjust the remainder of the traction device to the diameter of the wheel and the width of the tire, and thereafter proceed with turning the vehicle wheel to disengage it from the location in which it is stuck.

The improved tire traction device 10 of the present invention includes a cup member 11 which is of a size to receive a rim-securing nut or lug 12 which secures the rim to the axle. Cylinrical cup 11 includes a set screw 13 extending radially therethrough which is tightened with a wrench to secure cup member 11 firmly to nut 12. An elongated threaded shank 14 extends substantially coaxially with cup 11 and is received in elongated slot 15 of elongated link 16, which is wider than it is thick, as shown. A first nut 17 is threadably mounted on shank 14 and a washer 19 is positioned between nut 17 and link 16. After cup member 11 has been secured to nut 12, nut 17 is adjusted to a position wherein elongated link 16 will extend substantially perpendicularly to shank 14 while the side portion 20 of link 16 rests against the side wall of tire 21. Thereafter, a second nut 22 is tightened so as to cause washer 23 to bear against the outside surface of link 16. Thus, link 16 will be firmly clamped between washers 19 and 23.

The foregoing tightening is effected when tire traction device 10 is in the position shown in FIG. 1 with the traction member 24 bearing against the portion of the tread 25 of the tire which is off of the ground. It will be appreciated that elongated slot 15 permits the device 10 to be used on wheels of various diameters. More specifically, traction member 24 has its end 26 welded to the outer end of elongated link 16. A concave tire gripping member 27 has two elongated scalloped edges 29 on the outer sides thereof with the scalloped edges terminating at sharp points 30. These sharp points will dig into the tread 25 of the tire to prevent slippage between traction member 24 and the tire. The traction member 24 also includes a concave U-shaped member 31 which digs into the ground when the tire traction device 10 is in the position shown in FIG. 2. Thus, one side of the tire traction device will grip the tire and the other side will dig into the ground or other surface on which the tire rests. Because the sharp points 30 are on opposite sides of member 27, good gripping will be effected regardless of the direction in which the wheel is rotated.

As can be seen from a comparison of FIGS. 1 and 2, when the tire traction device 10 is initially installed, there will be a distance X between the shank 14 and the outer edge 32 of the traction member 24. However, after the wheel has been rotated to the position of FIG. 2, wherein the traction member 24 is located between the tire 21 and the ground, the distance between shank 14 and the outer edge 32 will be a distance Y, which is smaller than distance X. This occurs because shank 14 is located in elongated slot 15 and washers 19 and 23 bear on opposite sides of link 16, and thus elonated link 16 will have slid radially inwardly to the position of FIG. 2 after the weight of the vehicle was applied to the traction member 24. Because of this sliding relationship, the traction member 24 will be able to maintain a good gripping relationship with tire 21 regardless of the amount which the latter has flexed.

It will be appreciated that the tire traction device 10 is securely mounted on the wheel because of the attachment at cup member 11, the attachment between link 16 and shank 14, the attachment between gripping member 27 and the tire tread, and the bearing of elongated link 16 against the side of the tire.

After the vehicle has been moved out of the area in which it was stuck, the tire traction device 10 can be removed very easily from the wheel. All that is necessary is to loosen nut 22 so that elongated link 16 can be moved radially outwardly so that tire gripping member 27 is disengaged from the tire tread 25. Thereafter, it is only necessary to loosen set screw 13 and thereafter move device 10 away from the rim and the wheel.

By way of dimensions, elongated link 16 is approximately 15½ inches long, 1¼ inches wide, and ¼ inch thick. Slot 15 is approximately 6¼ inches long. The elongated shank 14 is approximately 3½ inches long and cup member 11 is approximately 1 inch long, and 15/16 inch in internal diameter. The tire traction member 24 is approximately 6 inches long. The tire gripping member 27 is approximately 4¾ inches long. The outer diameter of shank 14 is approximately 11/16 inches. The foregoing dimensions are strictly by way of example and not of limitation and the drawings are roughly to scale so that other dimensions can be interpolated from the drawings. It is preferred that the tire traction device be made out of a suitable carbon steel, but any other suitable material may be used.

An alternative construction for attaching a member, such as shank 14, relative to the rim of a wheel could be a tapped female member at the end of shank 14 which could be threaded onto the rim mounting stud after nut 12 has beeen removed, or it could be threaded onto the end of the stud provided that a sufficient length extended beyond nut 12. This alternate construction does not have the advantage of a construction utilizing the disclosed cup member 11 and set screw 13. In this respect the cup member and set screw can be used with a variety of sizes of nuts and thus one size can practically be used universally. On the other hand, the alternate tapped member would have to match the thread of the stud and thus different shank members, such as 14, would have to be used for different vehicles. It will be appreciated, however, that the shank 14 can mount either a cup member 11, such as shown in the drawings, or a tapped cup member such as described above.

It can thus be seen that the improved tire traction device of the present invention is a highly simplified device which can be mounted and demounted in an extremely simple and efficient manner from a wheel which requires the use of such a device, and while a preferred embodiment of the present invention has been disclosed, it will be appreciated that the present invention is not limited thereto but may be otherwise embodied within the scope of the following claims.

What is claimed is:

1. A tire traction device comprising a cup member for mounting on a rim-securing nut in mounted position on a wheel rim having a tire mounted thereon, an elongated shank extending outwardly from said cup member, an elongated link extending transversely to said elongated shank, securing means for securing said elongated shank to said elongated link, a traction member extending transversley to said elongated link for engagaing the tread of said tire and the ground, and a set screw extending radially through said cup member for securing said cup member to said rim-securing nut.

2. A tire traction device as set forth in claim 1 wherein said securing means comprise an elongated slot in said elongated link for receiving said elongated shank, stop means on said elongated shank positioned on one side of said elongated link for determining the distance between said cup member and said elongate link, and clamping means on said elongated shank on the opposite side of said elonated link from said stop means for clamping said elongated link between said stop means and said clamping means.

3. A tire traction device as set forth in claim 2 wherein said elongated shank is threaded, and wherein said stop means comprises a first nut threadably mounted on said elongated shank for varying the distance between said cup member and said elongated link, and wherein said clamping means comprises a second nut threadably mounted on said elongated shank.

4. A tire traction device as set forth in claim 3 wherein said elongated shank extends substantially perpendicularly to said elongated link.

5. A tire traction device as set forth in claim 4 wherein said cup member is substantially coaxial with said elongated shank.

6. A tire traction device comprising a member for fixed attachment relative to the rim of a wheel, an elongated shank extending outwardly from said member, an elongated link extending transversely to said elongated shank, a traction member extending transversely to said elongated link for engaging the tread of a tire and the ground, and securing means for securing said elongated shank to said elongated link while permitting said elongated link to slide radially inwardly relative to said rim when said traction member engages the ground.

7. A tire traction device as set forth in claim 6 wherein said securing means comprise an elongated slot in said elongated link for receiving said elongated shank, stop means on said elongated shank positioned on one side of said elongated link for determining the distance between said member and said elongated link, and clamping means on said elongated shank on the opposite side of said elongated link from said stop means for clamping said elongated link between said stop means and said clamping means.

8. A tire traction device as set forth in claim 7 wherein said elongated shank is threaded, and wherein said stop means comprises a first nut threadably mounted on said elongated shank for varying the distance betweeen said member and said elongated link, and wherein said clamping means comprises a second nut threadably mounted on said elongated shank.

9. A tire traction device as set forth in claim 8 wherein said elongated shank extends substantially perpendicularly to said elongated link.

* * * * *